(12) United States Patent
Roger et al.

(10) Patent No.: US 11,532,930 B2
(45) Date of Patent: Dec. 20, 2022

(54) MULTILAYER CONNECTOR WITH ENAMELED INSULATED CONDUCTORS

(71) Applicants: AUXEL, Gondecourt (FR); UNIVERSITE D'ARTOIS, Arras (FR)

(72) Inventors: Daniel Roger, Wimille (FR); Jean-Francois Wecxsteen, Bethune (FR); Stephane Duchesne, Beuvry (FR); Gabriel Velu, Audrehem (FR)

(73) Assignees: AUXEL, Gondecourt (FR); UNIVERSITE D'ARTOIS, Arras (FR)

( * ) Notice: Subject to any disclaimer, the term of this patent is extended or adjusted under 35 U.S.C. 154(b) by 268 days.

(21) Appl. No.: 16/753,275

(22) PCT Filed: Oct. 4, 2018

(86) PCT No.: PCT/FR2018/000231
§ 371 (c)(1),
(2) Date: Apr. 2, 2020

(87) PCT Pub. No.: WO2019/068969
PCT Pub. Date: Apr. 11, 2019

(65) Prior Publication Data
US 2020/0335958 A1 Oct. 22, 2020

(30) Foreign Application Priority Data
Oct. 6, 2017 (FR) ...................... 1759370

(51) Int. Cl.
*H02G 5/00* (2006.01)
*H01B 13/16* (2006.01)
(Continued)

(52) U.S. Cl.
CPC ............. *H02G 5/005* (2013.01); *H01B 13/16* (2013.01); *H01B 19/04* (2013.01); *H02B 1/20* (2013.01); *H02G 5/06* (2013.01)

(58) Field of Classification Search
CPC ............ H02G 5/005; H02G 5/06; H02G 5/00; H02G 5/02; H02G 5/025; H01B 13/16; (Continued)

(56) References Cited

U.S. PATENT DOCUMENTS

| 4,430,522 A | * | 2/1984 | Bader | H02G 5/005 |
| | | | | 29/854 |
| 4,840,924 A | | 6/1989 | Kibara | |

(Continued)

FOREIGN PATENT DOCUMENTS

| CN | 203607685 U | 5/2014 |
| CN | 205264989 U | 5/2016 |

(Continued)

OTHER PUBLICATIONS

Notification according to Article 94 (3) EPC dated Jun. 21, 2021 for related French Application No. 18793452.6.
(Continued)

*Primary Examiner* — Angel R Estrada
(74) *Attorney, Agent, or Firm* — David D. Brush; Westman, Champlin & Koehler, P.A.

(57) ABSTRACT

A method of manufacturing a connector device suitable for making an inter or intra static electrical energy converter connection. The device includes at least two flat conductors and at least one insulating material. The said method includes: preparing each flat conductor individually; applying at least one coat of enamel varnish to each conductor, which is thinner than a desired final thickness; carrying out cross-linking of the enamel coating; and repeating the depositing of a layer of enameling resin and the cross-linking until the chosen thickness is reached. The varnish coated conductors of the connector device are assembled by using a template and connecting elements.

14 Claims, 1 Drawing Sheet

(51) Int. Cl.
*H01B 19/04* (2006.01)
*H02B 1/20* (2006.01)
*H02G 5/06* (2006.01)

(58) Field of Classification Search
CPC ............ H01B 19/04; H01B 1/00; H02B 1/20;
H02M 7/00; H01F 27/28; H01F 41/12;
B05D 1/02; B05D 1/16; H01R 25/16;
H01R 13/53
USPC ...... 174/68.2, 72 B, 71 B, 88 B, 70 B, 99 B,
174/129 B, 133 B; 439/212, 213, 210
See application file for complete search history.

(56) References Cited

U.S. PATENT DOCUMENTS

| | | | |
|---|---|---|---|
| 4,885,187 A | 12/1989 | Koenig | |
| 5,760,339 A * | 6/1998 | Faulkner | H02G 5/007 174/88 B |
| 6,265,666 B1 | 7/2001 | Faulkner | |
| 7,557,298 B2 * | 7/2009 | Vanhoutte | H02G 5/005 174/68.2 |
| 8,697,993 B2 * | 4/2014 | Jur | H02G 5/06 174/68.2 |
| 10,305,203 B2 * | 5/2019 | Murakami | H01M 50/502 |
| 10,449,568 B2 * | 10/2019 | Astle | H01L 21/67011 |
| 10,685,766 B2 * | 6/2020 | Chen | H01B 1/023 |
| 2003/0113441 A1 | 6/2003 | Baumann et al. | |
| 2015/0003019 A1 | 1/2015 | Ide et al. | |

FOREIGN PATENT DOCUMENTS

| | | |
|---|---|---|
| CN | 106298098 A | 1/2017 |
| FR | 2590105 A1 | 11/1986 |

OTHER PUBLICATIONS

Search Report for French Application No. 1759370, dated Jun. 26, 2018, 2 pages.
English translation of Written Opinion of the International Searching Authority dated Jan. 22, 2019 for corresponding International Application No. PCT/FR2018/000231, filed Oct. 4, 2018.
International Search Report dated Jan. 14, 2019 for corresponding International Application No. PCT/FR2018/000231, filed Oct. 4, 2018.
Written Opinion of the International Searching Authority dated Jan. 14, 2019 for corresponding International Application No. PCT/FR2018/000231, filed Oct. 4, 2018.

* cited by examiner

MULTILAYER CONNECTOR WITH ENAMELED INSULATED CONDUCTORS

CROSS-REFERENCE TO RELATED APPLICATIONS

This Application is a Section 371 National Stage Application of International Application No. PCT/FR2018/000231, filed Oct. 4, 2018, the content of which is incorporated herein by reference in its entirety, and published as WO 2019/068969 on Apr. 11, 2019, not in English.

FIELD OF THE INVENTION

The invention relates to the technical field of electrical installations, conductors and power distribution, as well as to the field of apparatus and methods for the manufacture of such devices.

More particularly, the invention concerns, among other things, on the one hand, an electrically insulated laminated multilayer connector also called "busbar" and, on the other hand, the manufacturing process of the said connector.

BACKGROUND OF THE INVENTION

The term "laminated busbar" is usually used to refer to an electrical interconnection device, the function of which is to electrically connect the constituent parts of a static converter of electrical energy; but also to provide the connection technology provided outside the said converter.

This connection occurs in several contexts, for example:
  between power modules such as: Insulated Gate Bipolar Transistors (IGBTs), Integrated gate-commutated thyristors (IGCTs), diodes, and passive components such as capacitors or filters; implemented within this static converter of electrical energy, especially in the typical power range from 50 kW (kilowatt) to 8 MW (megawatt),
  when the "busbar" is directly encapsulated inside the power modules: between semiconductor circuits, and/or between semiconductor circuits and external connections (connection terminals), especially in the typical power range from 50 kW (kilowatt) to 200 kW (kilowatt).

The laminated multilayer connector also has the function of mechanically supporting the various elements involved.

Laminated connectors are generally made of a complex of flat conductors and insulating material(s). However, a "busbar" can also be made up of a single flat conductor.

A flat conductor is defined as a conductor such that one of its dimensions (preferably its thickness) is much smaller than the others. Such a conductor can be flat or bent. This stacking of flat conductors of different electrical phases justifies the main purpose of the laminated connector in comparison with conventional busbars or electrical cables; namely low inductance.

As an example, a laminated connector can consist of an assembly of several conductive plates, each plate corresponding to an electrical phase. Openings in the plates allow the connection of the components on one side with the other plates underneath. The components are usually screwed together. There are also connection lugs for connection to the outside of the converter.

Most often, the electrical insulation between the different conductive plates is made by electrical insulating films such as polyethylene terephthalate (PET), polyethylene polynaphthalate (PEN), polyimide (PI).

Usually, the said insulating film(s) is either stacked (interposed between conductors, we speak of stacked laminated "busbar" or "stacked"), or laminated to the flat conductor (laminated busbar).

These technologies have several disadvantages, which are discussed below.

In the case of a "stacked" or stacked "busbar", the films are not glued, and a device must be provided to geometrically hold its elements at least until it is mounted in the converter. This device is usually in the form of additional fixing parts made of electrically insulating material. In addition, the insulating distances in the air limit the operating voltage level of converters made of such connectors (to approx. 1000 volts).

In the case of lamination, the sheets are usually heat-glued, which requires the use of a heating press, a forming tool and flexible pressure distribution membranes, for example. Such equipment is energy-intensive, which is a major technical disadvantage. Only about 1% of the energy consumed is used to join the flat conductors and the film(s) together, the rest of the energy being dissipated throughout the metal frame of the press and the tool.

Due to the thermal inertia of the system and the thermal barrier formed by the flexible membranes, the production time is also long (around 1 to 2 hours) and therefore the hourly productivity is low; while the future needs in static converters are increasing (renewable energies, electric vehicles, smart-grid, . . . ).

Another technical problem encountered when laminating insulating films concerns the insulation quality of the device and more specifically the insulation quality of its edges (periphery of the conductor, edges of the openings provided in the conductors, etc.). Indeed, ideally, the "busbars" laminated with thermo-glued film are manufactured flat and then folded if necessary. Subsequent bending presents multiple risks: cracking of the film, cracking of the surface coating (e.g. nickel plating). Furthermore, when applying the insulating film(s), care must be taken to avoid creating air bubbles (air-filled cavity between the film and the conductor) or gaps (poorly glued or detached film) at the edges, because such defects generate the appearance of parasitic and highly detrimental phenomena such as partial discharges (all the more important as the dielectric field is high), which cause the insulating film to pierce over a longer or shorter period of time, resulting in the appearance of short-circuits. The design of multilayer connectors with a high partial discharge threshold is therefore highly preferable.

In addition, the growing need for speed in circuits requires the use of suitable and increasingly high-performance electronic components, for example based on silicon carbide or gallium nitride. These introduce severe constraints for "busbars", such as:
  required inductance values even lower than those currently achieved,
  an ability to withstand an operating voltage higher than the voltages currently encountered,
  an ability to withstand a switched current greater than the switched currents currently encountered,
  an ability to withstand higher operating temperatures than those currently reached.

Thus, in order to meet the above-mentioned constraints, films made of increasingly high-performance materials are currently being used, for example films made of PolyEtherEtherKetone (PEEK) or Polyimide (PI), but which are much more expensive. Also, the rise in temperature poses the problem of finding films and adhesives resistant to it.

Also, the main technical advantage of these devices, namely a low inductance (compared to traditional wiring), is a consequence of their flattened shape. Thus, it is obvious that the current technological development is based on the principle of scale reduction: it is known to achieve increasingly lower inductance values by reducing the thickness of the conductors and insulation films. However, this solution has an obvious limitation, since thinner films are also more fragile and delicate to handle and/or stick.

Knowing moreover that a low inductance makes it possible to limit overvoltages during current switching in electronic switches and that an increasingly high threshold for the occurrence of partial discharges is required, it is all the more obvious that improving the performance of multilayer connectors, through the choice of high-performance, easily removable and inexpensive materials, is a major technical challenge for the industry.

We are also aware of (CN 205264989) the insulation of conductors by depositing coloured thermosetting insulating powder (e.g. epoxy) which after baking forms an insulating barrier. The minimum thickness of the insulating layer obtained is about 100 microns. Unfortunately, the insulating barrier can fissure or crack, resulting in insulation defects. This is a common phenomenon, so manufacturers add a flexible insulating film. The application of an insulating layer obtained by electrostatic spraying of a thermoplastic powder is known (U.S. Pat. No. 6,265,666).

SUMMARY OF THE INVENTION

As demonstrated previously, there is a real need to provide a solution to the technical problem of improving the insulation of the flat conductors making up laminated multilayer connectors (especially at the edges) and the application of the chosen insulating material, while maintaining a reasonable manufacturing cost and increasing productivity.

The invention described in the present document responds to this need by offering an economically attractive solution and increased performance for multilayer connectors produced according to the prescribed method, which is free from the use of films.

For this purpose, the invention relates first of all to a process for manufacturing a connector device suitable inter alia for making an inter or intra static electrical energy converter(s) connection (power module circuits, capacitors, filters, connectors, . . . ), said device comprising at least two flat conductors and at least one insulating material, said process being noteworthy in that:
  we prepare each flat conductor individually,
  a layer of enamel varnish in liquid form is applied to each conductor in a thickness less than the desired final thickness,
  a the cross-linking of the enamel coating is carried out,
  a new coat of enamel varnish is applied and cross-linked until the chosen thickness is reached,
  the conductors of said connector device are assembled by means of a jig and connecting means.

To prepare the conductors, a surface treatment such as degreasing and/or deoxidation is first carried out.

Then a sparing is applied to each area of the conductor where electrical contact is to be established before applying the varnish in liquid form.

These masks are for example selected from the group comprising: plugs (e.g. made of heat-resistant, and/or water-tight, and/or mechanically fixed elastic material, and/or non-adhesive material), adhesives (e.g. peelable adhesives). The masks may all be of the same nature or may be mixed.

They can be reusable or disposable. Nevertheless, the technical specialist knows how to choose the nature of the masks, and their number according to the needs of the device to be manufactured.

The conductors can be suspended from a support or held in place by the sparing(s), the time needed to apply the varnish and cross-link it.

The enamel coating can be applied, for example, by spraying in thin layers using air as the carrier medium or by spraying only the liquid enamel coating in microdroplets, i.e. by spraying.

It can also be applied by dipping or spraying varnish, the viscosity of the enamel varnish, which is in liquid form, and the roughness of the conductor then determining the thickness of the deposited layer.

It can also be laid by centrifugal coating by means of a rotary wheel which rotates the enamelling operator at high speed. The final thickness of the deposited insulating layer depends on the amount of initial insulating material, its viscosity and the conditions of rotation (duration, rotation speed and acceleration).

By depositing thin layers, the risk of accidental localized lacks of varnish is reduced because the layers are deposited independently of each other. The risk of microcavities is reduced Cross-linking depends on the nature of the coating.

Cross-linking can be done by solvent evaporation or by chemical reaction with a curing agent. A thermal input usually initiates or accelerates this cross-linking. Cross-linking can also be carried out by UV for light-sensitive resins.

In one design variant, the layers may not be of the same thickness or type of resin. For example, the varnish of the first thin layer can be of polyurethane nature, characterized by a good adhesion on a copper surface, and the following ones of more resistant epoxy type varnish. And the last one in varnish loaded with coloured pigments.

Conductors can be prepared one by one or in batches depending on the means used to deposit the varnish.

When the conductors are ready, they must be assembled.

An assembly jig is used to position the connectors in relation to each other and to secure the conductors in relation to each other.

Following an initial production, mechanical components (screws, clips, inserts, rivets, etc.) made of insulating material are used.

According to a second realization, one calls upon adhesives in all forms, for example: glue pads, glue layer, adhesive film.

In one design variant, spacers made of insulating material such as mica foil or glass fibre mat are inserted between two conductors previously covered with enamel varnish. Alternatively, a silicone foil can be used, which is said to be thick (1 to 5 mm, typically 3 mm) to compensate for differences in thickness.

Preferably, the mounting jig has means for laterally wedging the conductors.

The invention also relates to any connector device obtainable by the implementation of the described process. The said connector device is, inter alia, suitable for making a connection between or within static electrical energy converter(s) (power module circuits, capacitors, filters, connectors, . . . ), i.e. it is suitable and capable of being used in order to make a connection:
  Intra-converter, i.e. for example:
    between at least two power modules (as previously defined) belonging to the same converter, or within a power module, for example: between at least two semiconductor chips, or between a semiconductor chip and an external connection, or Inter-converters, e.g. between at least two converters.

As described above, devices (busbars) are generally made of a complex of flat conductors and insulating material(s).

According to the invention, the flat conductors are preferably made of copper or aluminium. Advantageously (but not necessarily) the conductors are protected by a surface treatment, such as tinning, nickel plating, silver plating, among others. Preferably, the conductors have a thickness of between 1 and 4 millimetres.

The manufacturing process of the conductors (e.g. punching, bending, injection, casting) does not matter, and the technical specialist knows how to choose the most suitable process for the intended application.

Finally, the invention can be used for various purposes, such as laminated busbars of static electric energy converter, internal laminated busbars of power semiconductor modules, and the Depositor claims in particular the use of the proposed connector device, obtained by the implementation of the process presented, as an inter or intra static electric energy converter(s) connector.

BRIEF DESCRIPTION OF THE DRAWINGS

The invention shall be clearly understood by means of the following description (by way of a non-limitative example) of the drawings illustrating the interconnection device and the associated manufacturing process.

DETAILED DESCRIPTION OF ILLUSTRATIVE EMBODIMENTS

Figure 1:
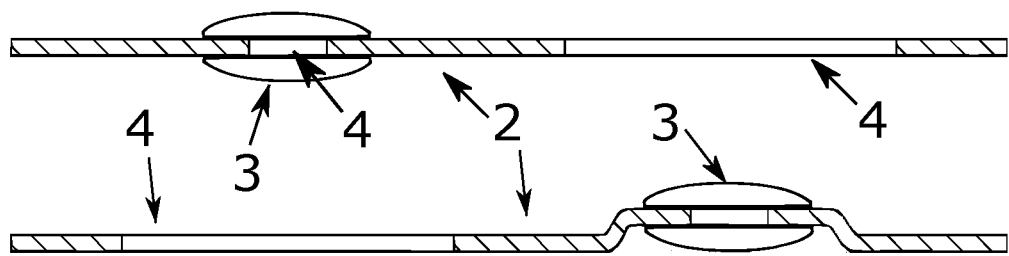
FIG. 1 shows two independent conductors, provided with protection masks for the electrical connection areas.

A multilayer connector device (1) is produced by means of the method according to the invention, which device (1), according to FIG. 1, is manufactured from at least one flat conductor (2), on which a spark gap (3) is optionally placed in each area of said conductor (2) where an electrical contact is to be established. The spark gap (3) may be placed on one side of the conductor (2), or may be through-going, at the level of a slot (4) made in said conductor (2).

Figure 2:
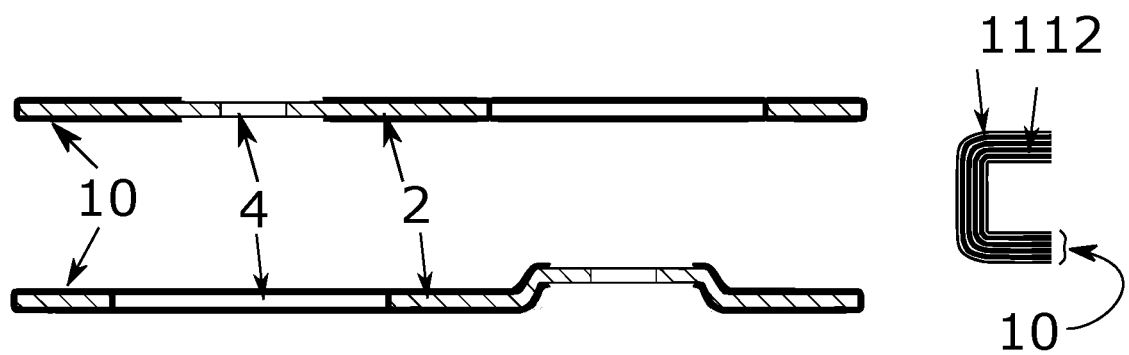
FIG. 2 shows two conductors, still independent, which have undergone the enamelling operations required by the process. The masks have been withdrawn. An enlarged section shows the detail of the stacking of the layers of varnish.

Depending on the manufacturing process, the application of spatter(s) is carried out before applying the varnish (10). As shown in FIG. 2, one or more layers (11, 12) of enamel varnish (10) are applied to the prepared conductors (2) and possibly provided with spacers (3). When the spacers (3) are removed, for example, holes (4) with varnish coating on the edges (hole (4) with thick edge on the lower conductor (2)) and holes with varnish coating on the edges of the holes protected by the spacers (3) (hole (4) with thin edge on the upper conductor (2)) are obtained.

Preferably, each conductor is individually coated with at least two layers of enamel varnish (10) in liquid form, subsequent layers are created only if the previous layer is cross-linked.

Enamel varnish (10) is a resin with special properties of adhesion to the electrical conductor, electrical resistance and thermal stability.

Most preferably, the enamel varnish (10) comprises at least one filler in the form of inorganic particles preferably smaller than 150 μm in size, such as for example: silica ($SiO_2$), alumina ($Al_2O_3$), magnesia (MgO). Thanks to this inorganic filler, the resin exhibits less alteration of its electrical characteristics under partial discharge stress. This technical possibility makes it possible to obtain a controlled service life in the presence of partial discharges, contrary to current technology which requires the absence of partial discharges.

Advantageously, the characteristic parameters of said enamel (10) are selected from:

dynamic viscosity: 100 to 4000 mPa·s, and/or temperature class: 120° C. to 240° C. (120/140/155/180/200/220/240° C.), according to IEC 60085: 2007, and/or dielectric strength greater than or equal to 30 kV/mm, and/or more preferably the chemical nature is chosen among: polyurethane (PUR), thermoplastic elastomer (TPE).

As an example, enamel varnish (10) can be chosen from the VOLTATEX WIRE® range (Dupont).

Enamelling varnish (10) can be cross-linked by the action of heat or by the action of Ultra Violet rays. For the latter, Green Isolight International can be chosen as an example:

the GII 206 which has a class of 180° C. and is based on polyester acrylate;

the GII 200 which has a class of 120° C. and which is polyalcohol modified acrylate.

To apply Coating (10), for example, Conductor (2) can be suspended by means of a hook that grips on a spacer 3.

The varnish (10) can then be sprayed onto the conductor (2).

The coating can be applied in the form of fine particles, by aerosol effect using a propellant gas (air or neutral gas such as nitrogen, for example) or by pressure.

Conductor (2) can also be dipped in a bath or sprayed with varnish (10). Another possibility is to apply the varnish by centrifugal coating.

Preferably, thin layers are applied to multiply the number of layers. The technical specialist will be able to determine the parameters necessary to achieve the desired thickness according to the characteristics of the varnishes used.

Preferably, according to the process, the assembly stage of said device (1) comprises at least one stage among: gluing stage(s), mechanical clamping stage(s).

Gluing (gluing step) includes for example: press gluing and/or hot-melt gluing and is carried out using a glue such as: transfer film adhesive, liquid glue.

Advantageously, the process according to the invention is remarkable in that:

first of all, a layer of enamel resin (10) of thickness A is applied, preferably by dipping followed by dripping (however, any other suitable method—depending on the chosen varnish (10)—can be used, such as spraying or centrifugal deposition), then said enamel varnish (1)0 is crosslinked and the deposition and crosslinking is repeated.

The technical specialist knows how to choose the number of iterations of the step cycle presented above, so as to obtain a desired final thickness B of enamel varnish (10), coating said flat conductors (2). Among other things, the number of iterations (and therefore the final thickness B) is chosen according to the voltage that device (1) must withstand.

Preferably, the said thickness B is between 30 and 200 microns, in order to enable the device to operate at a voltage of between 300 and 1250 volts. Preferentially, said thickness A is between 3 and 15 microns.

A first benefit of these different stages A of enameling resin (varnish) deposition (10) is to avoid the creation of microcavities in the thickness of the insulation (any microcavity being likely to become the location of partial discharges that are detrimental to the durability of the electrical performance of the insulation and/or the insulation.

A second benefit is to reduce the risk of an accidental localized lack of varnish (10) because the layers are applied independently of each other.

A third will be to take advantage of the specific characteristics of each type of coating (10), for example a first layer with a high adhesion capacity on conductive surfaces, a subsequent layer with higher mechanical performance, or an identification coloured coating (10) layer (e.g. coating with coloured pigments; this technical possibility allows unambiguous identification of one conductive layer compared to another).

The cross-linking of the enamel varnish coated (10) can, for example, take place spontaneously at room temperature or in an oven, by solvent evaporation, by chemical reaction with a curing agent, or under the influence of UV radiation.

Depending on a variant of the process, the different layers of varnish (10) applied are of different types and/or thicknesses.

Advantageously, according to a variant (joining step) of the process, the conductors (2) coated with enamel (10) varnish are joined together by means of mechanical parts made of insulating material.

In another variant (joining step) of the process, the conductors (2) coated with enamel varnish (10) are joined together by means of adhesive in any form.

Figure 3:
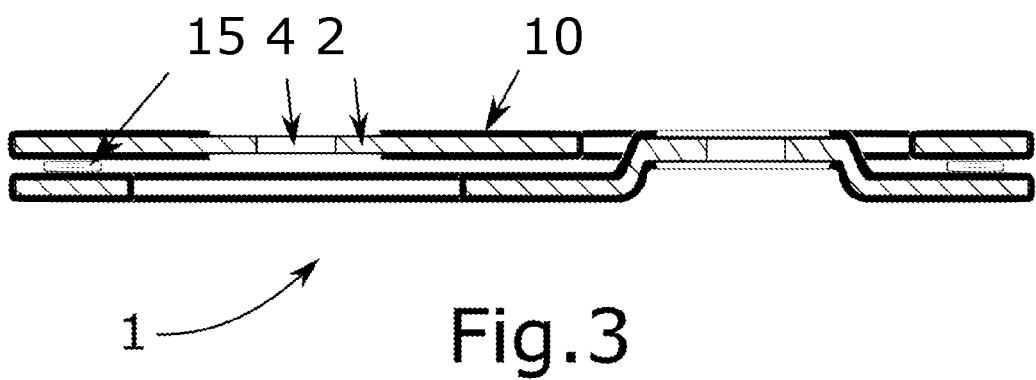
FIG. 3 shows the two previously enameled conductors assembled with glue pads to form the multilayer connector with enameled insulated conductors.

Preferably, as shown in FIG. 3, one or more insulating spacers, such as a sheet of insulating material (15) (e.g. mica), is inserted between two conductors (2) coated with enamel varnish (10).

Advantageously, the method according to the invention is remarkable in that in advanced variants of the preparation step for flat conductors (2), it further comprises at least one surface preparation step, chosen for example from among others: degreasing, dust removal.

Also, the proposed process makes it easier to consider a global ecological approach, by offering the possibility of using aqueous solvents instead of organic solvents in varnishes.

Finally, the invention concerns any device obtained by the previously described process, comprising at least two flat conductors (2) and at least one insulating material: varnish (10) (possibly in multilayer form (11, 12)), spacer (15).

Although the present disclosure has been described with reference to one or more examples, workers skilled in the art will recognize that changes may be made in form and detail without departing from the scope of the disclosure and/or the appended claims.

The invention claimed is:

1. A method of manufacturing a connector device suitable for making an inter or intra static electrical energy converter connection, said device comprising at least two flat conductors and at least one insulating material, said method comprising:

preparing each flat conductor individually;

applying a layer of enamel varnish in liquid form of less than a desired final thickness to each conductor;

cross-linking the enamel coating layer;

applying at least one additional layer of enamel varnish in liquid form and cross-linking the at least one additional layer until the desired final thickness is reached to form the at least one insulating material; and assembling the conductors, coated with varnish, of said connector device.

2. The method of manufacturing the connector device according to claim 1, further comprising placing a mask on each zone of the conductor where an electrical contact is to be established before applying the varnish in liquid form.

3. The method of manufacturing the connector device according to claim 1, wherein the varnish layer is applied in fine particles, using a gas as propellant, or by pressure.

4. The method of manufacturing the connector device according to claim 1, wherein the varnish layer is applied by dipping or spraying.

5. The method of manufacturing the connector device according to claim 1, wherein the varnish layer is applied by centrifugal coating.

6. The method of manufacturing the connector device according to claim 1, wherein the cross-linking of the varnish is carried out by evaporation of solvent or by chemical reaction with a curing agent or by UV action.

7. The method of manufacturing the connector device according to claim 1, wherein different layers of the varnish applied are of different types and/or thicknesses.

8. The method of manufacturing the connector device according to claim 1, wherein the conductors coated with enameled varnish are assembled by using mechanical parts made of insulating material.

9. The method of manufacturing the connector device according to claim 1, wherein the conductors coated with the enamel varnish are assembled by using adhesive.

10. The method of manufacturing the connector device according to claim 1, further comprising inserting a sheet of insulating material between two conductors coated with the enamel varnish.

11. A connector device suitable for making an inter or intra static electrical energy converter connection, said device comprising:

at least two flat conductors; and at least one insulating material applied to each of the at least two flat conductors, wherein the insulating material comprises a plurality of layers of enamel varnish, each layer of enamel varnish being applied in liquid form and being cross-linked, and the plurality of layers together having a desired thickness, and wherein the at least two flat insulated conductors are assembled.

12. The connector device according to claim 11, wherein the enamel varnish comprises at least one filler in the form of inorganic particles.

13. The connector device according to claim 11, wherein the enamel varnish comprises colored pigments.

14. The connector device according to claim 11, wherein the connector device is an inter or intra static electrical energy converter connector.

* * * * *